(12) United States Patent
Shimizu et al.

(10) Patent No.: US 9,604,573 B2
(45) Date of Patent: Mar. 28, 2017

(54) TRANSMISSIVE INFORMATION DISPLAY APPARATUS FOR OBSTACLE DETECTION OUTSIDE A VEHICLE

(71) Applicant: MITSUBISHI ELECTRIC CORPORATION, Tokyo (JP)

(72) Inventors: Hirokazu Shimizu, Tokyo (JP); Tsutomu Matsubara, Tokyo (JP); Taro Kumagai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/899,752

(22) PCT Filed: Jul. 5, 2013

(86) PCT No.: PCT/JP2013/068524
§ 371 (c)(1),
(2) Date: Dec. 18, 2015

(87) PCT Pub. No.: WO2015/001665
PCT Pub. Date: Jan. 8, 2015

(65) Prior Publication Data
US 2016/0144785 A1 May 26, 2016

(51) Int. Cl.
*G08B 21/00* (2006.01)
*B60R 1/00* (2006.01)
*B60R 11/02* (2006.01)
*G08G 1/16* (2006.01)
*B60K 37/02* (2006.01)
(Continued)

(52) U.S. Cl.
CPC ............... *B60R 1/00* (2013.01); *B60K 37/02* (2013.01); *B60Q 9/008* (2013.01); *B60R 11/02* (2013.01); *G08G 1/166* (2013.01); *G08G 1/167* (2013.01); *B60Q 3/044* (2013.01); *B60R 2300/202* (2013.01)

(58) Field of Classification Search
CPC ...................................................... B60R 1/00
USPC .................. 340/435, 436, 438, 903; 701/301
See application file for complete search history.

(56) References Cited

U.S. PATENT DOCUMENTS

2007/0089054 A1  4/2007  Morimoto
2011/0090073 A1  4/2011  Ozaki

FOREIGN PATENT DOCUMENTS

JP          5-56640 U    7/1993
JP        11-115546 A    4/1999
JP       2004-74843 A    3/2004
(Continued)

*Primary Examiner* — Jeffery Hofsass
(74) *Attorney, Agent, or Firm* — Birch, Stewart, Kolasch & Birch, LLP

(57) ABSTRACT

An information display apparatus includes: an around-the-vehicle sensor 3 that detects an obstacle around a vehicle; a transmissive display apparatus 4 which has a plurality of LEDs 42 disposed inside a vehicle interior structural member, and performs a display by lights of LEDs 42 transmitted through a surface of the structural member and irradiated outside; and a controller 2 that determines a driver's driving operation based on vehicle information about a driving operation, and allows the transmissive display apparatus 4 provided at the structural member present in a direction of a blind spot area in which the obstacle is detected by the around-the-vehicle sensor 3, among the blind spot areas formed by the vehicle interior structural members obstructing the visual field of a driver looking outside the vehicle in the driving operation, to display information on the obstacle.

13 Claims, 11 Drawing Sheets

(51) Int. Cl.
*B60Q 9/00* (2006.01)
*B60Q 3/04* (2006.01)

(56) References Cited

FOREIGN PATENT DOCUMENTS

| | | |
|---|---|---|
| JP | 2004-148911 A | 5/2004 |
| JP | 2007-94618 A | 4/2007 |
| JP | 2007-122536 A | 5/2007 |
| JP | 2009-96380 A | 5/2009 |
| JP | 2009-119230 A | 6/2009 |
| JP | 2012-256273 A | 12/2012 |
| JP | 2013-32082 A | 2/2013 |
| WO | WO 2009/157446 A1 | 12/2009 |

(a)

(b)

(c)

(a)

(b)

(a)

(b)

(a)

(b)

(a)

(b)

TRANSMISSIVE INFORMATION DISPLAY APPARATUS FOR OBSTACLE DETECTION OUTSIDE A VEHICLE

TECHNICAL FIELD

The present invention relates to an information display apparatus that displays outside-of-vehicle information to a vehicle occupant.

BACKGROUND ART

For example, in a vehicle display apparatus described in Patent Document 1, an imaging means captures outside-of-vehicle information which is a driver's blind spot formed by a pillar, and a holographic display apparatus provided inside a vehicle performs holographic display of the outside-of-vehicle information captured by the imaging means on the pillar. By this, the driver's blind spot formed by the pillar is overcome, enabling to improve ease of driving operation.

CITATION LIST

Patent Document

Patent Document 1: JP 11-115546 A

SUMMARY OF THE INVENTION

Problems to be Solved by the Invention

For a conventional display apparatus that displays outside-of-vehicle information, there is, for example, a display apparatus that displays a captured video of an area behind a vehicle which is captured by a backup camera on an in-vehicle monitor.

In such a general display apparatus, the captured video outside the vehicle is displayed on a display monitor present at a front portion inside the vehicle. For this reason, when the vehicle is backed up, while a driver visually checks a vehicle moving direction (back direction), he/she also needs to visually check the video outside the vehicle which is displayed on the display monitor, resulting in poor ease of driving operation.

Meanwhile, for example, in a place inside the vehicle to which a driver's line of sight is directed in a driving operation, the display monitor is disposed that displays the outside-of-vehicle information about that direction. By this, the driver does not need to greatly change the direction of his/her line of sight, so that the ease of driving operation can also be improved.

However, each of the plurality of display monitors disposed inside the vehicle needs to be the display monitor that displays the captured video outside the vehicle at a resolution usable for driving support. Accordingly, the apparatus size increases and thus the cost increase is inevitable. In addition, a condition where display screens are disposed in a plurality of places inside the vehicle is not desirable in terms of design, too.

Note that, as in a conventional technique represented by Patent Document 1, holographic display can be performed by disposing holographic display apparatuses in a plurality of places inside the vehicle; however, there is a need to dispose, inside the vehicle, a plurality of complex holographic display apparatuses including a reflective holographic projection lens, a holographic screen, etc. Therefore, the same inconvenience as that described above may occur.

The present invention is made to solve the problems described above, and an object of the invention is to obtain an information display apparatus capable of displaying outside-of-vehicle information by a simple configuration and in a mode in which an occupant can easily visually check the information, without impairing vehicle interior design.

Means for Solving the Problems

An information display apparatus according to the present invention includes: an outside-of-vehicle detector that detects an obstacle around a vehicle; a transmissive display which has a plurality of light-emitting elements disposed inside a vehicle interior structural member, and performs a display by lights of the light-emitting elements transmitted through a surface of the structural member and irradiated outside; and a controller that determines a driver's driving operation based on vehicle information about a driving operation, and allows the transmissive display at the structural member present in a direction in which the obstacle is detected by the outside-of-vehicle detector, among the vehicle interior structural members that form blind spot areas by obstructing a visual field of a driver looking outside the vehicle in the driving operation, to display information on the obstacle.

Effect of the Invention

According to the present invention, there is an effect that outside-of-vehicle information can be displayed by a simple configuration and in a mode in which an occupant can easily visually check the information, without impairing vehicle interior design.

MODES FOR CARRYING OUT THE INVENTION

Hereinafter, for illustrating the present invention in more detail, embodiments for carrying out the invention will be described according to the accompanying drawings.

First Embodiment

Figure 1:
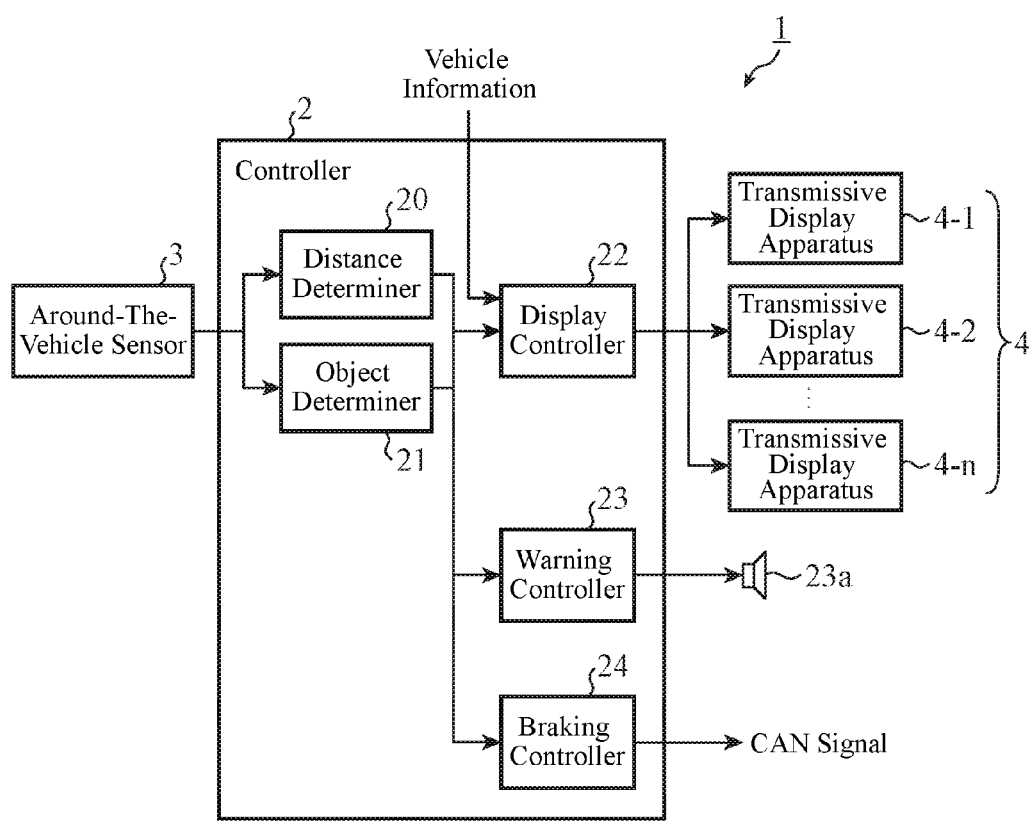
FIG. 1 is a block diagram showing a configuration of an information display apparatus according to a first embodiment of the present invention.

FIG. 1 is a block diagram showing a configuration of an information display apparatus according to a first embodiment of the invention.

In FIG. 1, an information display apparatus 1 is a display apparatus that is provided on a vehicle to display information on the outside of the vehicle, and is configured to include a controller 2, around-the-vehicle sensors 3, and transmissive display apparatuses 4 (4-1, 4-2, ..., 4-n).

The controller 2 is a controller that controls display performed by the transmissive display apparatuses 4, and is implemented by, for example, a vehicle-mounted CPU which is used for vehicle control such as engine control.

Specifically, by the vehicle-mounted CPU executing a program that describes the functions of the controller 2, a distance determiner 20, an object determiner 21, a display controller 22, a warning controller 23, and a braking controller 24 which are shown in FIG. 1 are implemented as specific means where hardware and software cooperate with each other.

The around-the-vehicle sensors 3 are outside-of-vehicle detectors that detect an obstacle around the vehicle, and employs sensors capable of detecting information about an object outside the vehicle and about the distance thereof to the vehicle, such as an ultrasonic sensor, a camera, a millimeter wave radar, an infrared sensor, and a laser sensor.

In addition, the around-the-vehicle sensors 3 are installed in a plurality of places of the vehicle to accurately detect the obstacle around the vehicle. For example, the sensors are provided at the front left and right portions, back left and right portions, and left and right side portions of the vehicle.

The distance determiner 20 determines, from information on the obstacle detected by the around-the-vehicle sensor 3, a distance between the vehicle and the obstacle. For example, when one of the sensors constituting the around-the-vehicle sensors 3 is a sensor that irradiates a detection wave thereto and receives a reflected wave of the detection wave, the distance determiner calculates the distance between the obstacle and the vehicle, based on the reflected wave of the detection wave that is reflected off an object. Note that, as mentioned above, for the detection wave, there are an ultrasonic wave, a laser beam, a millimeter wave, etc.

The object determiner 21 determines, from the information on the obstacle detected by the around-the-vehicle sensor 3, a type of the obstacle. For example, when one of the sensors constituting the around-the-vehicle sensors 3 is a camera that captures an area around the vehicle, the object determiner determines the most matched type of obstacle by comparing an outline of a subject enhanced by binarizing a captured image with outline patterns which are preset for different types of obstacles.

The display controller 22 is a controller that controls the transmissive display apparatuses 4, and determines a driver's driving operation based on vehicle information about a driving operation which is inputted from a vehicle control apparatus (not shown), and allows the transmissive display apparatus 4 at a structural member present in a direction in which the obstacle is detected by the around-the-vehicle sensor 3 among the vehicle interior structural members that form blind spot areas by obstructing the visual field of the driver looking outside the vehicle in the above driving operation, to display the information on the obstacle.

For example, the display controller 22 determines the driving operation based on the vehicle information about the driving operation such as the direction of rotation of a steering wheel and/or the gear position, and when the vehicle is traveling forward, the display controller 22 identifies the structural members such as A-pillars which cause the blind spot areas in the driver's forward and forward left and right visual fields.

Here, when the obstacle is detected on the right side of the vehicle by the around-the-vehicle sensor 3, the display controller 22 determines the A-pillar on the right side among the identified structural members, as the structural member present in a direction in which the obstacle is detected by the around-the-vehicle sensor 3, and allows the transmissive display apparatus 4 at the corresponding structural member to display the information on the obstacle.

In addition, when the vehicle turns left, the display controller 22 identifies the A-pillar, B-pillar, C-pillar, door, etc., on the left side which cause the blind spots in involvement checking, as the structural members that can form the blind spots in such a driving operation. Here, when the obstacle is detected on the left side of the vehicle, the display controller 22 determines among the identified A-pillar, B-pillar, C-pillar, and door on the left side, as the structural member present in the direction in which the obstacle is detected by the around-the-vehicle sensor 3, and allows the transmissive display apparatus 4 at the corresponding structural member to display the information on the obstacle.

Furthermore, when the vehicle moves backward while turning right, the display controller 22 identifies D-pillars, a back door, a rear hatch, a back seat, etc., as the structural members that can form the blind spots in such a driving operation. Here, when the obstacle is detected on the right side of the vehicle, the display controller determines the D-pillar, back door, rear hatch, back seat, or the like on the right side, as the structural member present in the direction in which the obstacle is detected by the around-the-vehicle sensor 3, and allows the transmissive display apparatus 4 at the corresponding structural member to display the information on the obstacle.

The display controller 22 allows the transmissive display apparatus 4 to perform a simple display indicating the presence of the obstacle detected by the around-the-vehicle sensor 3. For the simple display, there are, for example, an arrow mark indicating the direction in which the obstacle is present, a simple image representing an outline of the obstacle, and letters indicating the presence of the obstacle (indication words such as "here" and "there"). By doing so, the driver can instantaneously and intuitively recognize the presence of the obstacle around the vehicle. Accordingly, even during driving, a driver's attention is not taken away by checking for the obstacle.

In addition, the display controller 22 changes the display mode of the simple display indicating the presence of the obstacle around the vehicle, according to the distance of the obstacle to the vehicle which is determined by the distance determiner 20 and the type of the obstacle which is determined by the object determiner 21.

For example, it is considered to intuitively notify the driver of an approach to the vehicle by increasing the size of the arrow mark indicating the direction in which the obstacle is present, according to the distance. In addition, it is also considered to gradually change the display color to a warning color (red) or gradually increase the luminance, or a light-emitting pattern such as blinking may be changed.

In the case where the type of obstacle is another vehicle, it may approach the vehicle rapidly as compared to a pedestrian, etc., so that such a case needs to be dealt with promptly. For this reason, when the type of obstacle is a vehicle, the timing of changing the display mode is made faster compared to when the obstacle is the pedestrian, etc.

By thus modifying the timing of changing the display mode of the simple display according to the type of obstacle, a driving support that matches the actual driving scene can be performed.

The warning controller 23 is a controller that is connected to a speaker 23a disposed inside the vehicle and that allows the speaker 23a to emit a warning sound, according to the type of obstacle determined by the object determiner 21 and the distance thereof to the vehicle determined by the distance determiner 20.

For example, the display controller 22 may perform the simple display of the obstacle on the transmissive display apparatus 4, and the warning controller 23 may allow to emit the warning sound simultaneously therewith. By doing so, the fact that the pedestrian or obstacle has approached the vehicle can be clearly reported to the driver.

The braking controller 24 is connected to a braking apparatus (not shown) of the vehicle, and outputs a controller area network (CAN) signal to the braking apparatus when the vehicle has reached a distance where the vehicle almost comes into contact with the obstacle, based on the type of the obstacle determined by the object determiner 21 and the distance thereof to the vehicle determined by the distance determiner 20, to automatically stop the vehicle. By thus providing the braking controller 24, a collision between the pedestrian or obstacle and the vehicle can be properly avoided.

The transmissive display apparatuses 4 (4-1, 4-2, ..., 4-n) are transmissive displays, each of which has a plurality of LEDs disposed inside each of the various vehicle interior structural members, and performs display by lights of the LEDs which are transmitted through a surface of the structural member and irradiated outside.

FIGS. 2(a) to 2(c) are diagrams showing the transmissive display apparatuses of the first embodiment. In addition, FIGS. 3(a) and 3(b) are diagrams showing an outline of the transmissive display apparatus of the first embodiment. FIG. 2(a) shows a vehicle interior front portion, and a dashboard 5 has a woodgrain design surface 5a formed on a front thereof.

The structural members that obstruct the driver's visual field for the outside of the vehicle include, for example, A-pillars 8a and 8b present on both sides of a windshield 6. In the example of FIG. 2(a), the transmissive display apparatuses 4-1, 4-2, and 4-3 are respectively provided at a portion of a design surface 5a indicated by a reference sign A and portions of the A-pillars 8a and 8b indicated by reference signs B1 and B2.

FIG. 2(b) is an enlarged view of the portion of the design surface 5a indicated by the reference sign A, and FIG. 2(c) is a cross-sectional view taken along a line A1-A1 of FIG. 2(b) viewed from an arrow direction. As shown in FIG. 2(b), the surface of the structural member (design surface 5a) where the transmissive display apparatus 4-1 is provided maintains its design as it is. Specifically, as shown in FIG. 2(c), a board 41 having LEDs 42 mounted thereon as a plurality of light-emitting elements is embedded in a recess formed in the above-described structural member, and a surface portion 40 is provided so as to cover the board. As shown in FIG. 2(b), the surface portion 40 is provided with the same design (woodgrain) as that provided therearound, but is formed of a material that hinders visibility from the outside to the inside in a state in which the LEDs 42 are not irradiating light. For the material, there is, for example, a translucent resin having translucency.

The display controller 22 can turn on and off each of the plurality of LEDs 42 by controlling an LED driver (not shown) mounted on the board 41. FIG. 3(a) shows a state in which the surface portion 40 of the design surface 5a of FIG. 2(b) is removed. As such, each of the plurality of LEDs 42 forms a pixel of a display screen of the transmissive display apparatus 4-1. For example, as shown in FIG. 3(a), the LEDs 42 are turned on in the shape of the arrow mark out of the plurality of LEDs 42. By this, as shown in FIG. 3(b), an arrow mark "a" is displayed by the lights of the LEDs 42 which are transmitted through the surface portion 40 of the woodgrain design surface 5a and irradiated outside.

Next, an operation thereof will be described.

Figure 4:
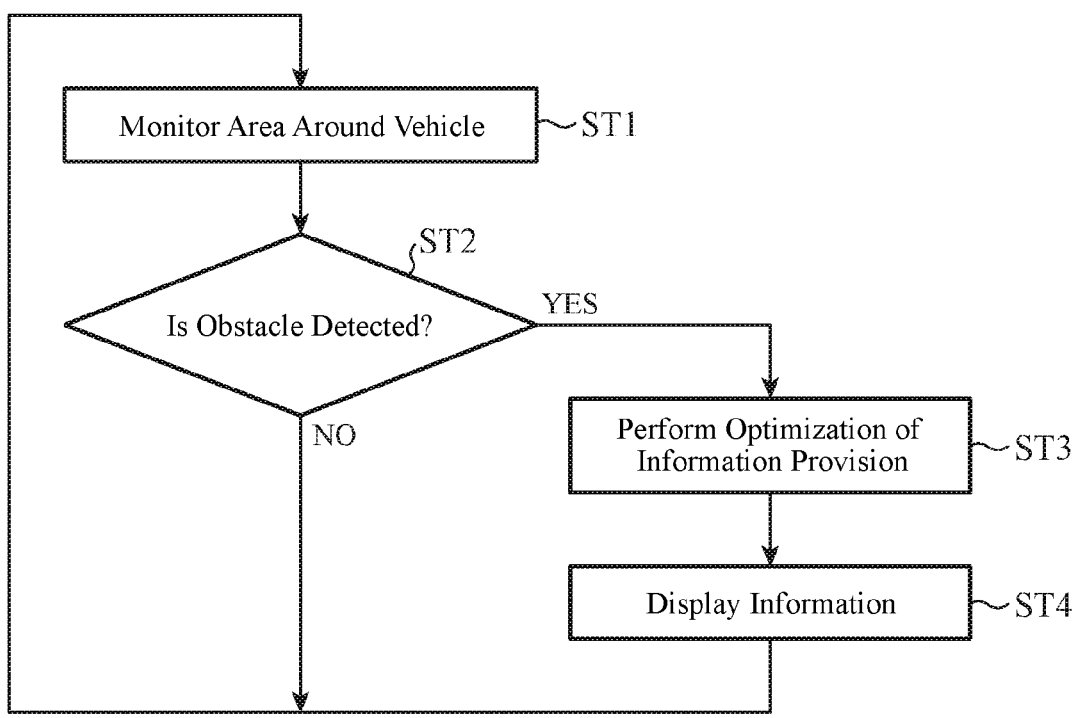
FIG. 4 is a flowchart showing an operation of the information display apparatus according to the first embodiment.

FIG. 4 is a flowchart showing the operation of the information display apparatus according to the first embodiment, and shows processes of displaying the presence of the obstacle around the vehicle.

While the vehicle is being used, the around-the-vehicle sensors 3 detect information around the vehicle at all times, as a process of monitoring the obstacle present around the vehicle. The information around the vehicle detected by the around-the-vehicle sensors 3 is sequentially inputted to the distance determiner 20 and the object determiner 21. The distance determiner 20 and the object determiner 21 are put in a determination operation waiting state until the obstacle is detected around the vehicle by any of the around-the-vehicle sensors 3. The operations up to this point correspond to a process at step ST1.

If the obstacle is not detected around the vehicle by the around-the-vehicle sensor 3 (step ST2; NO), the processing returns to step ST1 and the process of monitoring the obstacle present around the vehicle is repeated.

If the obstacle is detected around the vehicle by the around-the-vehicle sensor 3 (step ST2; YES), the distance determiner 20 determines the distance between the vehicle and the obstacle, from information on the obstacle detected by the around-the-vehicle sensor 3. In addition, the object determiner 21 determines a type of the obstacle from the information on the obstacle detected by the around-the-vehicle sensor 3. Determination results made by the distance determiner 20 and the object determiner 21 are outputted to the display controller 22.

While the vehicle is being used, the display controller 22 sequentially accepts, as input, the vehicle information about the driving operation from the vehicle control apparatus, and determines the driver's driving operation based on the vehicle information.

At this time, when the determination results made by the distance determiner 20 and the object determiner 21 are inputted to the display controller, the display controller 22 identifies the transmissive display apparatus 4 at the structural member present in the direction in which the obstacle is detected by the around-the-vehicle sensor 3 among the vehicle interior structural members that form the blind spot areas by obstructing the visual field of the driver looking outside the vehicle in the determined driving operation.

For example, when the driving operation is a left turn, the display controller 22 identifies the A-pillar, B-pillar, C-pillar, door, etc., on the left side that cause the blind spots in the involvement checking, as the structural members that can form the blind spots in such a driving operation. Here, when the obstacle is detected on the left side of the vehicle, the display controller 22 determines the structural member present in the direction in which the obstacle is detected by the around-the-vehicle sensor 3 among the A-pillar, B-pillar, C-pillar, and door on the left side, as a part where the information on the obstacle is to be displayed.

Thus, the process of identifying the optimal transmissive display apparatus 4 where the information on the obstacle is to be displayed is called optimization of information provision. The operations up to this point correspond to step ST3.

Finally, the display controller 22 allows the transmissive display apparatus 4 at the structural member identified at step ST3 to display the information on the obstacle (step ST4).

Figure 2:
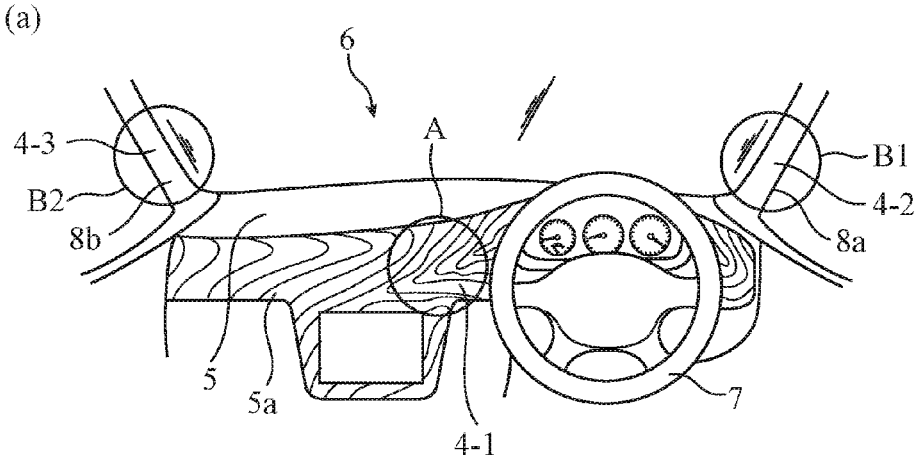
FIGS. 2(a) to 2(c) are diagrams showing transmissive display apparatuses of the first embodiment.
Figure 2:
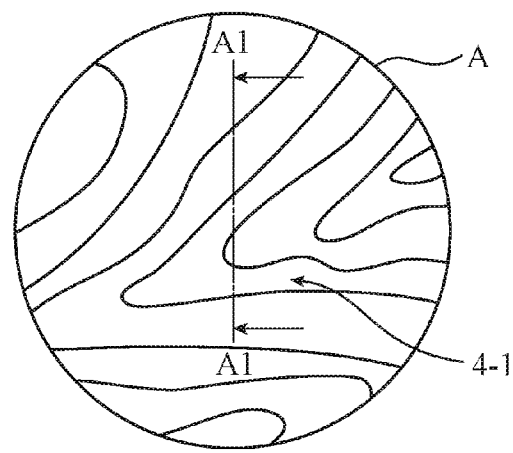
Figure 2:
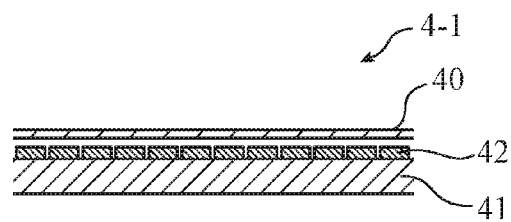
Figure 3:
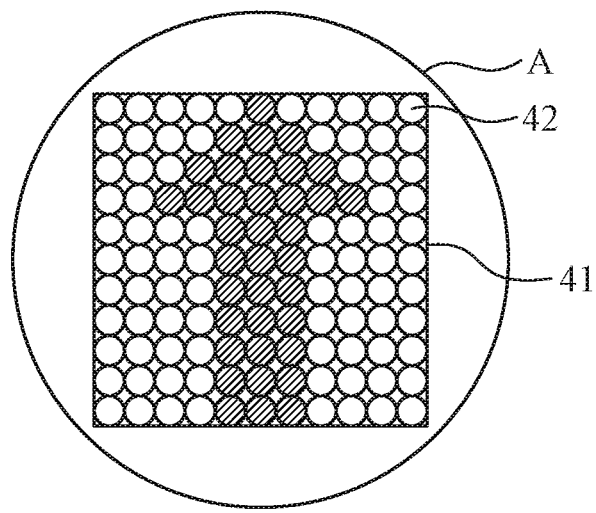
FIGS. 3(a) and 3(b) are diagrams showing an outline of a transmissive display apparatus of the first embodiment.
Figure 3:
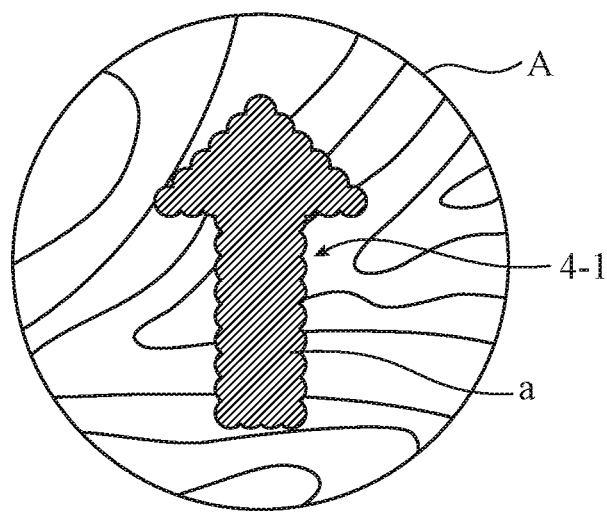

As shown in FIGS. 2(*a*) to 2(*c*) and 3(*a*) and 3(*b*), since the transmissive display apparatus 4 is a display apparatus that performs the display by the lights of the plurality of LEDs 42 which are transmitted through the surface portion 40 of the structural member and irradiated outside, it cannot display an image around the vehicle at a high resolution.

Accordingly, the transmissive display apparatus 4 performs the simple display indicating the presence of the obstacle. For this, there are, for example, the arrow mark indicating the direction in which the obstacle is present, the simple image representing an outline of the obstacle, and the letters indicating the presence of the obstacle (indication words such as "here" and "there").

When a detailed image is displayed, driver's driving may become careless due to his/her attempting to recognize what the image is. In the present invention, on the other hand, since the simple display of the presence of the obstacle is performed, the driver can instantaneously and intuitively recognize the presence of the obstacle around the vehicle.

Next, display of outside-of-vehicle information of the present invention will be exemplified.

Figure 5:
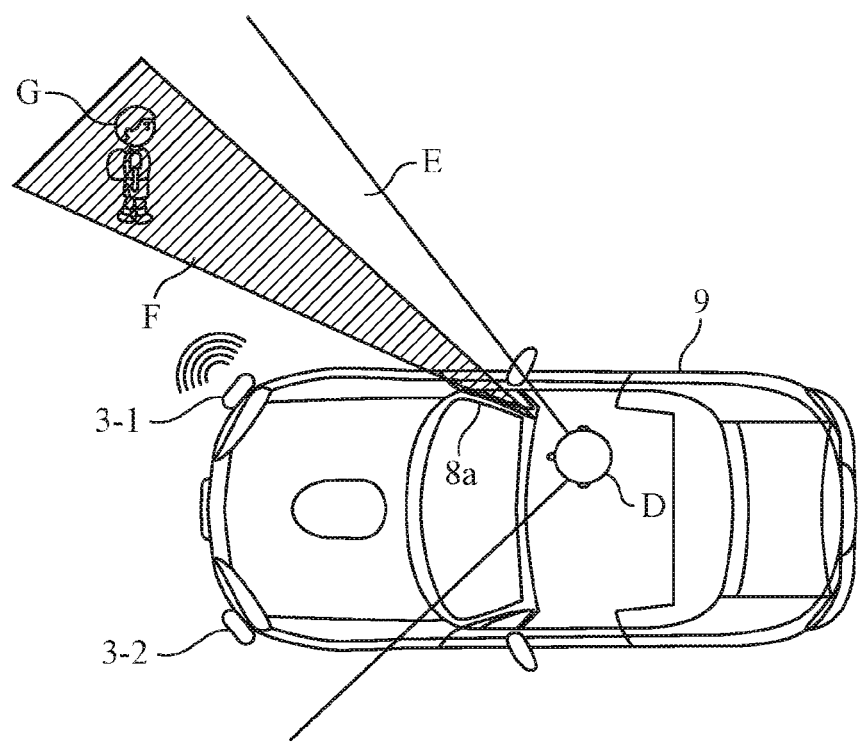
FIGS. 5(a) and 5(b) are diagrams showing an example of display of outside-of-vehicle information performed by the information display apparatus according to the first embodiment (part 1).
Figure 5:
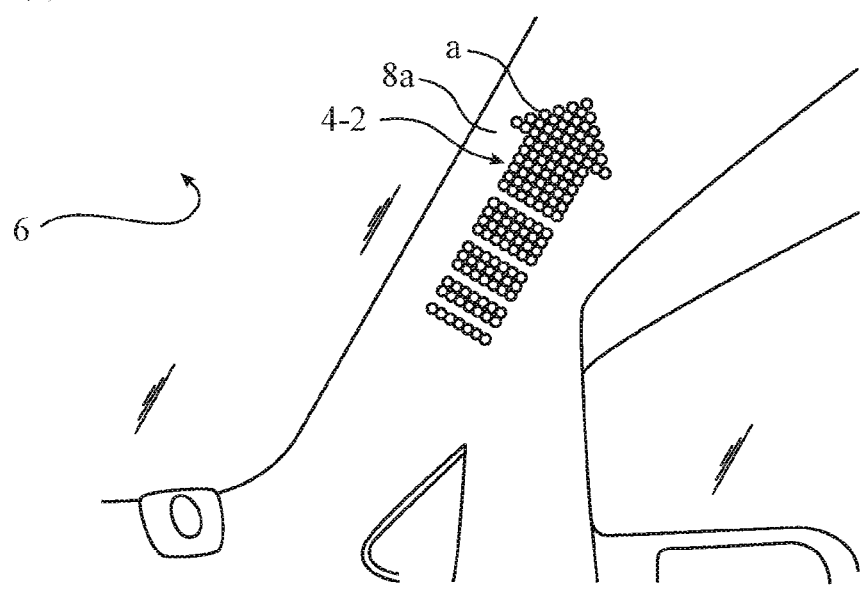

FIGS. 5(*a*) and 5(*b*) are diagrams showing an example of display of outside-of-vehicle information performed by the information display apparatus according to the first embodiment, and show an example of display of outside-of-vehicle information in forward traveling of the vehicle.

When, as shown in FIG. 5(*a*), the display controller 22 determines that a vehicle 9 is traveling forward, based on the vehicle information about the driving operation such as the direction of rotation of the steering wheel and/or the gear position, the display controller identifies the structural members at the front and at the front left and right such as the A-pillars on the left and right, as the vehicle interior structural members that form a blind spot area F by obstructing a visual field E of a driver D looking outside the vehicle.

Here, when an obstacle (pedestrian) G is detected on the right side of the vehicle 9 by the around-the-vehicle sensor 3-1 on the right side among around-the-vehicle sensors 3-1 and 3-2, the display controller 22 determines an A-pillar 8*a* on the right side among the identified structural members, as the structural member present in a direction in which the obstacle G is detected by the around-the-vehicle sensor 3.

Thereafter, as shown in FIG. 5(*b*), the display controller 22 allows the transmissive display apparatus 4-2 at the A-pillar 8*a* to display the arrow mark "a" indicating the presence of the obstacle G.

At this time, the display controller 22 may change the display mode of the arrow mark "a" indicating the presence of the obstacle G, according to the distance of the obstacle G to the vehicle 9 determined by the distance determiner 20 and the type of the obstacle G (pedestrian) determined by the object determiner 21. In the case of FIG. 5(*b*), since the pedestrian which is the obstacle G is approaching the vehicle 9, the arrow mark "a" is blinking.

Figure 6:
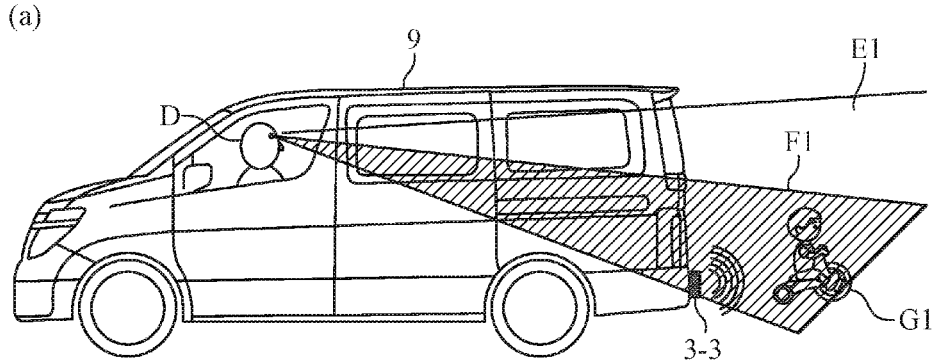
FIGS. 6(a) and 6(b) are diagrams showing an example of display of outside-of-vehicle information performed by the information display apparatus according to the first embodiment (part 2).
Figure 6:
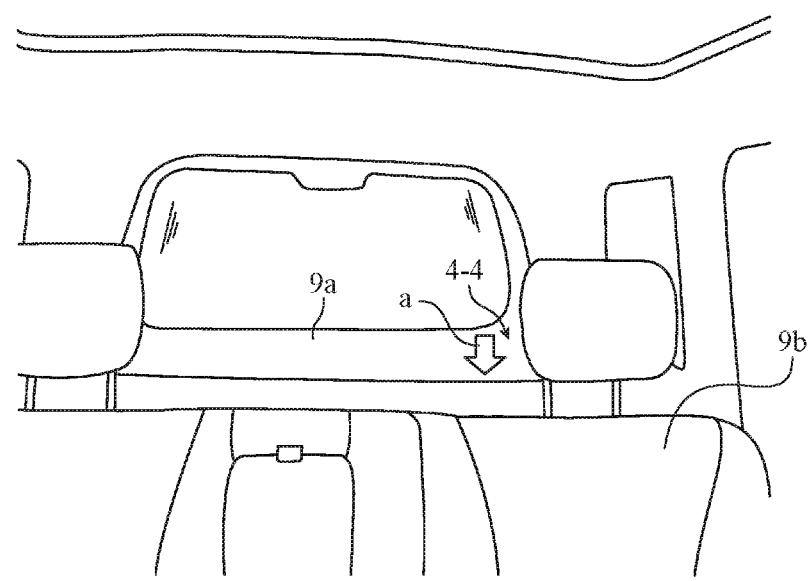

FIGS. 6(*a*) and 6(*b*) are diagrams showing an example of display of outside-of-vehicle information performed by the information display apparatus according to the first embodiment, and show an example of display of outside-of-vehicle information in backward movement of the vehicle.

When, as shown in FIG. 6(*a*), the display controller 22 determines, based on the vehicle information, that the vehicle 9 is moving backward, the display controller identifies the structural members such as a rear hatch 9*a* and a back seat 9*b*, as the vehicle interior structural members that form a blind spot area F1 by obstructing a visual field E1 of the driver D looking outside the vehicle.

Here, when an obstacle (child) G1 is detected by the around-the-vehicle sensor 3-3 present at the back left of the vehicle, the display controller 22 determines the rear hatch 9*a* as the structural member present in a direction in which the obstacle G1 is detected. Then, as shown in FIG. 6(*b*), the display controller allows the transmissive display apparatus 4-4 present on the left side of the rear hatch 9*a* (part on the right side as viewed from the driver D) to display the arrow mark "a" indicating the presence of the obstacle G.

Figure 7:
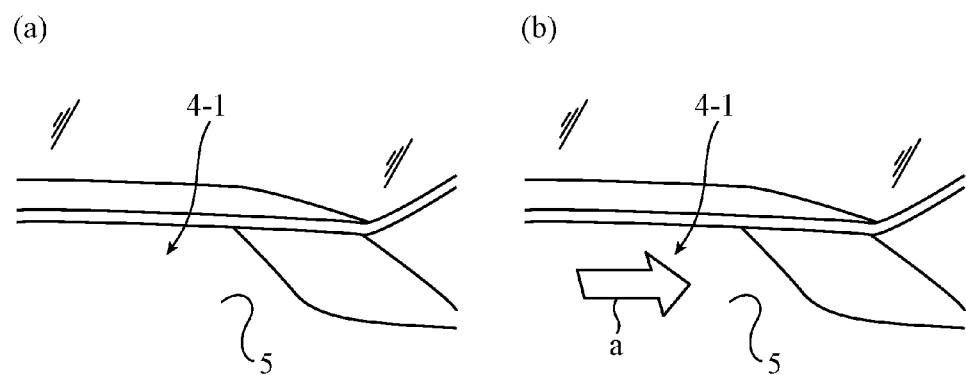
FIGS. 7(a) and 7(b) are diagrams showing an example of display of outside-of-vehicle information performed by the information display apparatus according to the first embodiment (part 3).

FIGS. 7(*a*) and 7(*b*) are diagrams showing an example of display of outside-of-vehicle information performed by the information display apparatus according to the first embodiment, and show the case in which outside-of-vehicle information about the obstacle G is also displayed on the transmissive display apparatus 4-1 provided at a dashboard 5 around a driver's seat, in addition to the display of FIG. 5(*b*).

When information on the obstacle is displayed on the transmissive display apparatus 4 at the structural member present in a direction in which the obstacle is detected by the around-the-vehicle sensor 3, normally, as shown in FIG. 7(*a*), the display is not performed on the transmissive display apparatus 4-1 at the dashboard 5, but the display may be further performed on the transmissive display apparatus 4 at the structural member present around the driver's seat.

For example, while, as shown in FIG. 5(*b*), the arrow mark "a" indicating the presence of the obstacle G is displayed on the transmissive display apparatus 4-2 at the A-pillar 8*a*, as shown in FIG. 7(*b*), the arrow mark "a" is also displayed on the transmissive display apparatus 4-1 at the dashboard 5 present around the driver's seat.

Thus, by displaying the presence of the obstacle G in a plurality of places near the driver, driver's awareness of the obstacle is promoted, enabling to support safe driving.

Note that the display mode of the arrow mark "a" displayed on the transmissive display apparatus 4-1 may also be changed according to the distance of the obstacle G to the vehicle 9 and the type of the obstacle G (pedestrian).

Figure 8:
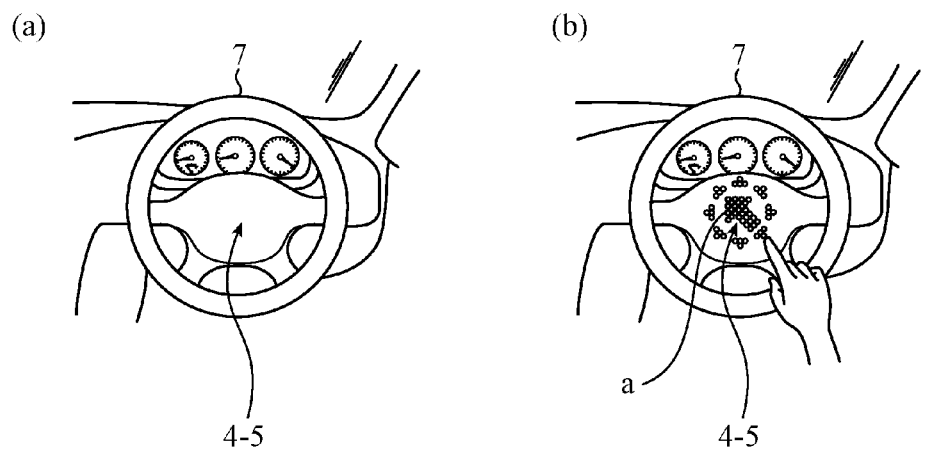
FIGS. 8(a) and 8(b) are diagrams showing an example of display of vehicle information performed by the information display apparatus according to the first embodiment.

FIGS. 8(*a*) and 8(*b*) are diagrams showing an example of display of vehicle information performed by the information display apparatus according to the first embodiment, and show a case in which the direction of rotation of the steering wheel is displayed on the transmissive display apparatus provided at the steering wheel.

As shown in FIG. 8(a), the transmissive display apparatus 4-5 and an acceleration sensor (not shown) for detecting the direction of rotation of a steering wheel 7 are provided at the steering wheel 7.

The display controller 22 allows the transmissive display apparatus 4-5 to display the vehicle information or the direction of rotation of the steering wheel 7 determined by the above acceleration sensor, as the arrow mark "a", as shown in FIG. 8(b). By doing so, the driver can easily recognize the direction of rotation of the steering wheel 7.

As described above, according to the first embodiment, the information display apparatus 1 includes the around-the-vehicle sensors 3 that detect the obstacle around the vehicle; the transmissive display apparatuses 4, each of which has the plurality of LEDs 42 disposed inside the vehicle interior structural member, and performs display by the lights of the LEDs 42 which are transmitted through the surface of the structural member and irradiated outside; and the controller 2 that determines the driver's driving operation based on the vehicle information about the driving operation, and allows the transmissive display apparatus 4 at the structural member present in the direction in which the obstacle is detected by the around-the-vehicle sensor 3 among the vehicle interior structural members that form the blind spot areas by obstructing the visual field of the driver looking outside the vehicle in the driving operation, to display the information on the obstacle. By such a configuration, the outside-of-vehicle information can be displayed by a simple configuration and in a mode in which an occupant can easily visually check the information, without impairing vehicle interior design.

In addition, according to the first embodiment, the controller 2 allows the transmissive display apparatus 4 to perform the simple display representing the presence of the obstacle detected by the around-the-vehicle sensor 3. In particular, the simple display is provided with any one of a symbol, a simple image, and letters indicating the presence of the obstacle. By doing so, the driver can easily recognize the presence of the obstacle around the vehicle.

Further, according to the first embodiment, the controller 2 changes the display mode of the simple display, according to the type of the obstacle and the distance to the vehicle which are determined based on the information on the obstacle detected by the around-the-vehicle sensor 3. By doing so, the driver can easily recognize a relationship between the obstacle around the vehicle and the vehicle.

Furthermore, according to the first embodiment, since the transmissive display apparatuses 4 are provided at at least one of the pillar, door, and seat of the vehicle, the transmissive display apparatuses can be disposed in the areas that cause the blind spots in the visual field of the driver looking outside the vehicle, so that the presence of the obstacle in these blind spot areas can be accurately displayed.

Furthermore, according to the first embodiment, the controller 2 further allows the transmissive display apparatus 4 at the structural member present around the driver's seat, to display the information on the obstacle detected by the around-the-vehicle sensor 3.

Thus, by displaying the presence of the obstacle around the vehicle in the plurality of places near the driver, the driver's awareness of the obstacle is promoted, enabling to support the safe driving.

Furthermore, according to the first embodiment, the controller 2 allows the transmissive display apparatus 4 provided at the steering wheel to display the direction of rotation of the steering wheel which is determined based on the vehicle information. By doing so, the driver can easily recognize the direction of rotation of the steering wheel.

Second Embodiment

Figure 9:
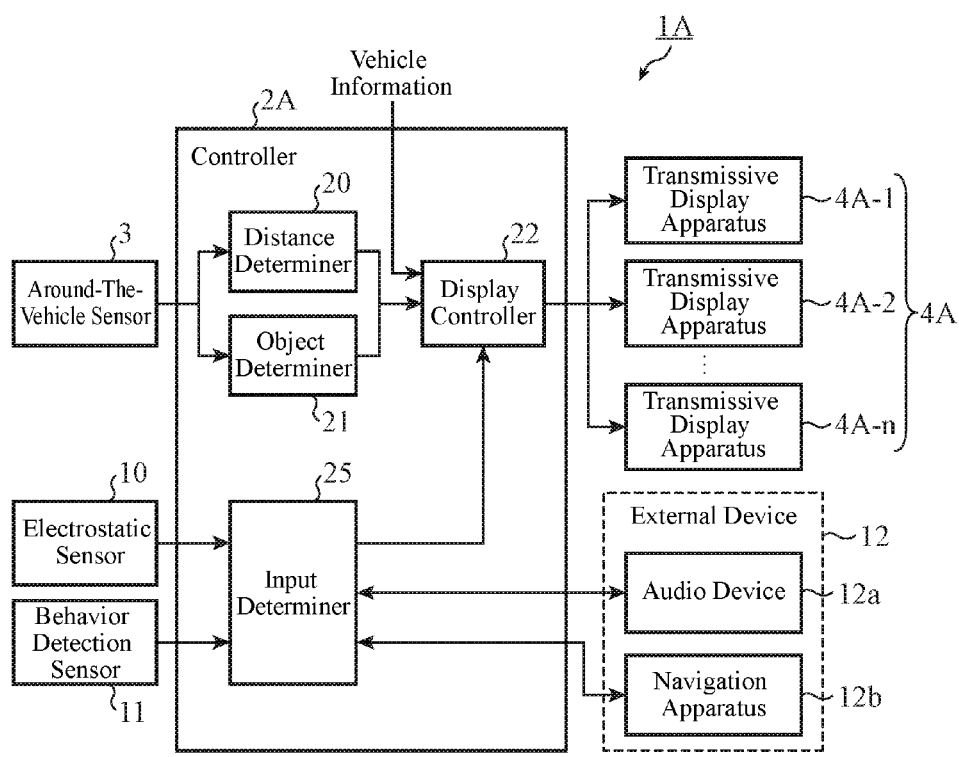
FIG. 9 is a block diagram showing a configuration of an information display apparatus according to a second embodiment of the invention.

FIG. 9 is a block diagram showing a configuration of an information display apparatus according to a second embodiment of the present invention. As shown in FIG. 9, an information display apparatus 1A is a display apparatus that is provided on a vehicle to display information on the outside of the vehicle, and is configured to include a controller 2A, around-the-vehicle sensors 3, transmissive display apparatuses 4A (4A-1, 4A-2, . . . , 4A-n), electrostatic sensors 10, and a behavior detection sensor 11.

In addition, the controller 2A includes an input determiner 25 instead of the warning controller 23 and the braking controller 24 of the first embodiment.

The controller 2A is a controller that controls display performed by the transmissive display apparatuses 4A, and is implemented by, for example, a vehicle-mounted CPU which is used for vehicle control such as engine control.

Specifically, by the vehicle-mounted CPU executing a program that describes functions of the controller 2A, a distance determiner 20, an object determiner 21, a display controller 22, and the input determiner 25 which are shown in FIG. 9 are implemented as specific means where hardware and software cooperate with each other.

The input determiner 25 determines input contents of the electrostatic sensors 10, the behavior detection sensor 11, and an external device 12, and notifies the display controller 22 of results of the determination. For example, it is determined, based on detection information of the electrostatic sensor 10 or the behavior detection sensor 11, whether a driver has checked for an obstacle around the vehicle. In addition, the input determiner 25 functions as an interface with the external device 12, and accepts, as input, information about an operation and/or setting from the external device 12, notifies the display controller 22 of the information, and outputs a content of the operation and/or setting accepted by the electrostatic sensors 10, etc., to the external device 12.

The electrostatic sensors 10 each are an external input detector that is provided in the transmissive display apparatus 4A to accept an external input. For example, the electrostatic sensor is configured of an electrostatic sensor system, not a pressure-sensitive touch panel. By this, there is no need to dispose a sensor surface on the uppermost surface of a design surface and thus the design characteristic is not impaired. In addition, by forming the electrostatic sensor 10 of an elastic material that allows the electrostatic sensor 10 to be disposed even on a surface with a curvature, the transmissive display apparatus 4A can be disposed in a vehicle interior elastic place.

Figure 10:
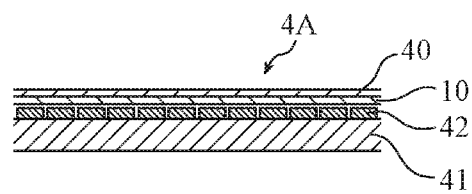
FIG. 10 is a diagram showing a configuration of a transmissive display apparatus of the second embodiment.

FIG. 10 is a diagram showing a configuration of a transmissive display apparatus of the second embodiment, and is a cross-sectional view cut at the same position as the line A1-A1 of FIG. 2(b) viewed from the arrow direction. As shown in FIG. 10, in the transmissive display apparatus 4A, as the electrostatic sensor 10, an electrostatic sensor type panel is provided on the back side of a surface portion 40. By a user touching the surface portion 40, this touch operation information is detected by the electrostatic sensor 10 and inputted to the input determiner 25.

The behavior detection sensor 11 is a behavior detector that detects driver's behavior, illustrated by, for example, an in-vehicle camera that captures the driver. The captured image is inputted to the input determiner 25, as driver's behavior detection information. The input determiner 25 performs an image-analysis on the captured video and thereby determines whether the driver has made a gesture of checking for the obstacle (finger pointing check, etc.) or whether the direction of the driver's line of sight has been directed to the obstacle.

Note that although FIG. 9 shows a configuration in which the information display apparatus 1A includes both the electrostatic sensors 10 and the behavior detection sensor 11, when used for the purpose of detecting a user's obstacle check, it may be configured to include either one of the electrostatic sensors 10 and the behavior detection sensor 11.

The external device 12 is an electronic device that performs processes corresponding to the operation content which is inputted to the input determiner 25, and includes an audio device 12a and a navigation apparatus 12b.

For example, when a simple operation mode of the external device 12 is set on the information display apparatus, the display controller 22 performs a simple display for the operation and/or setting of the external device 12, on the transmissive display apparatus 4A provided at a structural member present in a driver's reachable area, i.e., around a driver's seat. The driver performs a touch operation on the surface portion 40, based on the simple display for the operation and/or setting on the transmissive display apparatus 4A.

The driver's touch operation is detected by the electrostatic sensor 10 and the detection information is outputted to the input determiner 25. The input determiner 25 determines a content of the touch operation based on the detection information, and the external device 12 performs the operation and setting according to the determined content.

By doing so, the operation and setting of the external device 12 become possible using the simple display, enabling to improve user convenience.

Next, an operation thereof will be described.

Figure 11:
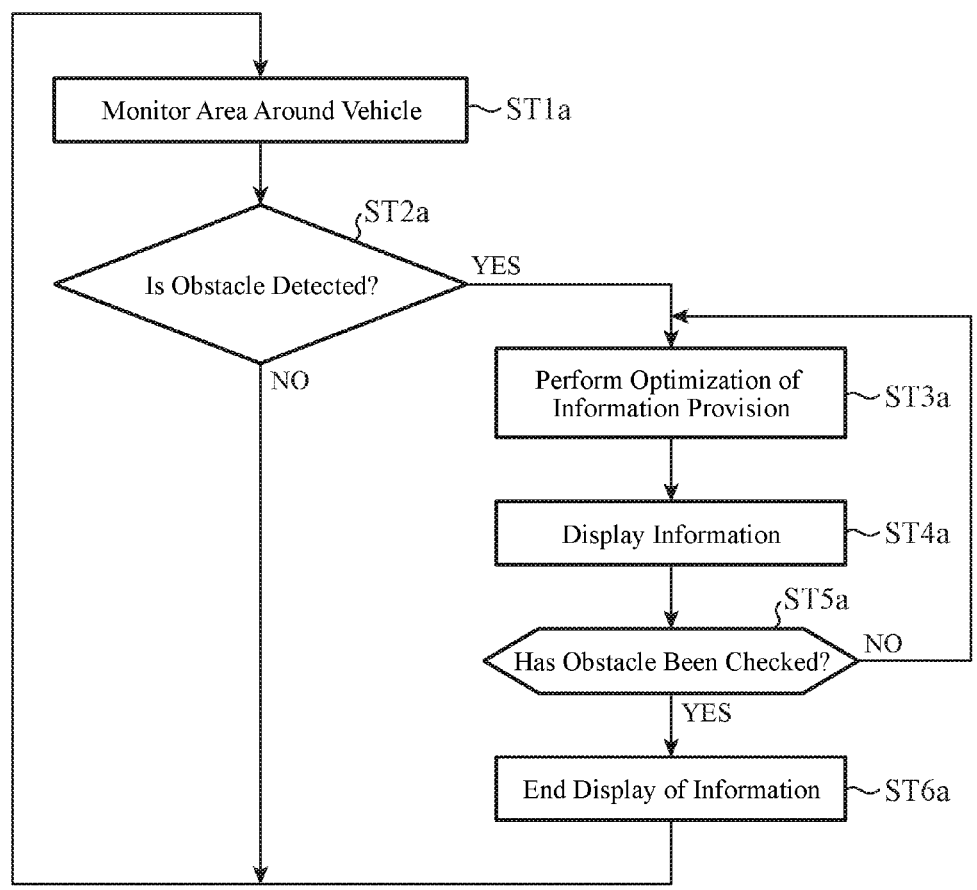
FIG. 11 is a flowchart showing an operation of the information display apparatus according to the second embodiment.

FIG. 11 is a flowchart showing the operation of the information display apparatus according to the second embodiment, and shows processes from when the presence of the obstacle around the vehicle is displayed to when the display ends by the driver checking for the obstacle. Note that, in FIG. 11, steps ST1a to ST3a are the same as steps ST1 to ST3 in FIG. 4 and thus description thereof is omitted.

At step ST4a, the display controller 22 allows the transmissive display apparatus 4A (which may be the transmissive display apparatus 4) at the structural member which is identified at step ST3a and the transmissive display apparatus 4A at the structural member present around the driver's seat, to display information on the obstacle detected by the around-the-vehicle sensor 3.

Here, the structural member present around the driver's seat may be any structural member within driver's reach, illustrated by, for example, the dashboard 5 shown in FIGS. 7(a) and 7(b) and the steering wheel 7 shown in FIGS. 8(a) and 8(b).

Note that the display on the transmissive display apparatus 4A at the structural member present around the driver's seat is performed for the purpose of a driver's obstacle check, and thus, the display mode of the obstacle information may be changed between the transmissive display apparatus 4A at the structural member which is identified at step ST3a and the transmissive display apparatus 4A at the structural member present around the driver's seat. For example, while the transmissive display apparatus 4A at the structural member which is identified at step ST3a displays an arrow mark "a" indicating the direction of the obstacle, the transmissive display apparatus 4A at the structural member present around the driver's seat displays a symbol (e.g., a circle mark) indicating the presence of the obstacle.

While the information on the obstacle is being displayed on the transmissive display apparatuses 4A, the input determiner 25 determines whether the driver has checked for the obstacle (step ST5a).

For example, when the electrostatic sensor 10 included in the transmissive display apparatus 4A at the structural member present around the driver's seat has accepted an external input, it is determined that the driver has checked for the obstacle.

In addition, when it is detected from the detection information of the behavior detection sensor 11 that the driver has made a gesture of checking for the obstacle (finger pointing check, etc.) or the direction of the driver's line of sight has been directed to the obstacle, it is determined that the driver has checked for the obstacle.

If it is determined that the driver has not checked for the obstacle (step ST5a; NO), the input determiner 25 notifies the display controller 22 of such a fact. When the display controller 22 receives the above notification from the input determiner 25, processing returns to step ST3a to perform optimization of information provision at that point in time, and the aforementioned processes are repeated.

If it is determined that the driver has checked for the obstacle (step ST5a; YES), the input determiner 25 notifies the display controller 22 of such a fact. When the display controller 22 receives the notification from the input determiner 25, the display controller immediately makes the display contents of the transmissive display apparatuses 4A disappear and thereby ends the display of the obstacle (step ST6a). By doing so, the information on the obstacle is displayed on the transmissive display apparatuses 4A until the driver checks for the obstacle, thereby promoting driver's awareness of the obstacle.

In addition, once the driver has checked for the obstacle, the display of the obstacle disappears, so that a driver's attention can be prevented from being taken away to visually check the information on the obstacle.

Next, the operation and/or setting of the external device 12 will be described.

When the audio device 12a is connected as the external device 12 to the input determiner 25, the input determiner 25 determines the contents of the operations and settings that are executable by the audio device 12a, using the transmissive display apparatus 4A. The contents of the operations and/or settings may be preset on the information display apparatus 1A or may be set by the user as appropriate.

For example, when the operation of selecting a music piece from a music list is possible, the input determiner notifies the display controller 22 to perform the display corresponding to the above operation. Note that a monitor that displays the music list is included in the audio device 12a.

When the display controller 22 receives the notification, the display controller, for example, allows the transmissive display apparatus 4A provided at the dashboard 5 or the steering wheel 7 to display the arrow mark "a" for scrolling the music list. By the user performing the touch operation on the arrow mark "a", the electrostatic sensor 10 detects the touch operation and outputs the detection information to the input determiner 25.

When the input determiner 25 determines, based on the detection information obtained by the electrostatic sensor 10, a content of the touch operation performed on the arrow mark "a" by the user, the input determiner outputs a result of the determination to the audio device 12a. The audio device 12a performs processes for an operation content according to the result of the determination. Specifically, the music list is scrolled according to the touch operation performed on the arrow mark "a", and the music piece is selected.

When the navigation apparatus 12b is connected as the external device 12 to the input determiner 25, the input determiner determines the contents of the operations and/or settings that are executable by the navigation apparatus 12b, using the transmissive display apparatus 4A. The contents of operations and/or settings may be preset on the information display apparatus 1A or may be set by the user as appropriate.

For example, when the operation of scrolling a map display is possible, the input determiner 25 notifies the display controller 22 to perform the display corresponding to the operation. Note that a monitor that displays a map is included in the navigation apparatus 12b.

When the display controller 22 receives the notification, the display controller allows, for example, the transmissive display apparatus 4A at the steering wheel 7 to display the arrow mark "a" shown in FIG. 8(b). By the user performing the touch operation on the arrow mark "a", the electrostatic sensor 10 detects the touch operation and outputs the detection information to the input determiner 25.

When the input determiner 25 determines, based on the detection information obtained by the electrostatic sensor 10, a content of the touch operation performed on the arrow mark "a" by the user, the input determiner outputs a result of the determination to the navigation apparatus 12b. The navigation apparatus 12b performs processes for an operation content according to the result of the determination. Specifically, the map display is scrolled according to the touch operation performed on the arrow mark "a".

In addition, the navigation apparatus 12b and the information display apparatus 1A may be allowed to operate in conjunction with each other.

For example, the navigation apparatus 12b outputs information about route guidance to the input determiner 25. The input determiner 25 determines a vehicle traveling direction based on the information about the route guidance which is inputted from the navigation apparatus 12b, and outputs a result of the determination to the display controller 22.

Based on the vehicle traveling direction determined by the input determiner 25, the display controller 22 allows the transmissive display apparatus 4A provided at the dashboard 5 or the steering wheel 7 to display the arrow mark "a" indicating the vehicle traveling direction. By this, simple navigation indicating the traveling direction by the arrow mark "a" can be performed.

Note that although the audio device 12a and the navigation apparatus 12b are exemplified as the external device 12, the external device is not limited to these electronic devices as long as there is provided with any electronic device that performs processes corresponding to the operation content which is inputted to the input determiner 25. For example, broadcast receivers such as a radio and a television set may be used or portable terminals such as a smartphone may be used.

As described above, according to the second embodiment, the information display apparatus 1A includes the electrostatic sensors 10 that accept the external input, and the controller 2A performs the simple display for the operation and/or setting of the external device 12 on the transmissive display apparatus 4A, determines the content of the external input accepted by the electrostatic sensor 10 based on the simple display for the operation and/or setting of the external device 12 performed on the transmissive display apparatus 4A, and allows the external device 12 to perform the process according to the content. By doing so, the operation and/or setting of the external device 12 can be performed using the simple display, enabling to improve user convenience.

In addition, according to the second embodiment, the information display apparatus 1A includes the electrostatic sensors 10 that accept the external input, and the controller 2A determines the content of the external input accepted by the electrostatic sensor 10 based on the display of the obstacle on the transmissive display apparatus 4A, and when the content of the external input is the check for the obstacle, the controller makes the display of the obstacle on the transmissive display apparatus 4A disappear.

By doing so, the information on the obstacle is displayed on the transmissive display apparatus 4A until the driver checks for the obstacle, thereby promoting the driver's awareness of the obstacle.

In addition, once the driver has checked for the obstacle, the display of the obstacle disappears, so that the driver's attention can be prevented from being taken away to visually check the information on the obstacle.

Furthermore, according to the second embodiment, the information display apparatus 1A includes the behavior detection sensor 11 that detects the driver's behavior, and the controller 2A determines the driver's behavior accepted by the behavior detection sensor 11, based on the display of the obstacle on the transmissive display apparatus 4A, and when the driver's behavior is the behavior of checking for the obstacle, the controller 2A makes the display of the obstacle on the transmissive display apparatus 4A disappear.

By doing so, as with the case of the electrostatic sensor 10, the information on the obstacle is displayed on the transmissive display apparatus 4A until the driver checks for the obstacle, thereby promoting the driver's awareness of the obstacle. In addition, once the driver has checked for the obstacle, the display of the obstacle disappears. Thus, the driver's attention can be prevented from being taken away to visually check the information on the obstacle.

Third Embodiment

Figure 12:
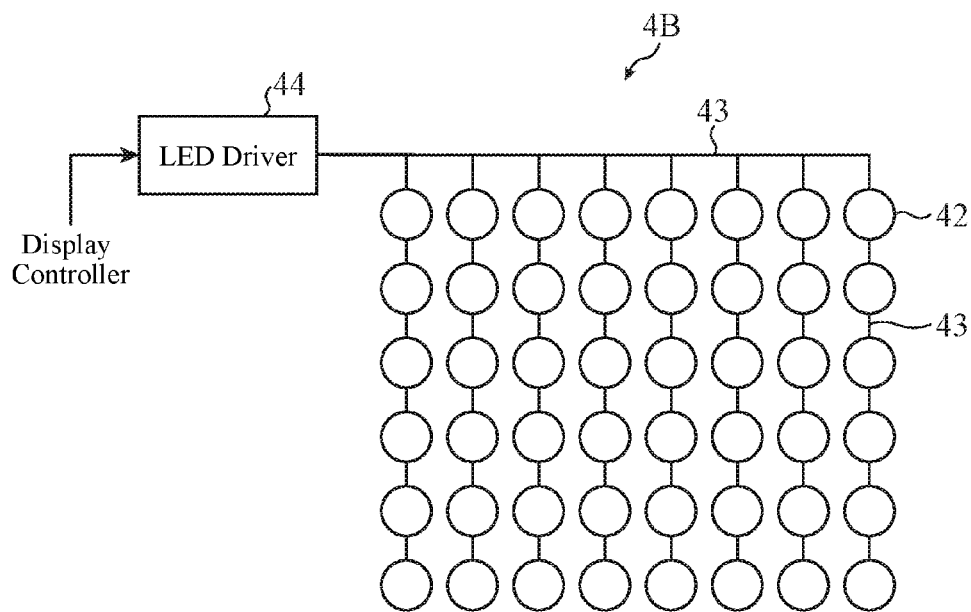
FIG. 12 is a diagram showing a configuration of a transmissive display apparatus in an information display apparatus according to a third embodiment of the invention.

FIG. 12 is a diagram showing a configuration of a transmissive display apparatus in an information display apparatus according to a third embodiment of the present invention. As shown in FIG. 12, a transmissive display apparatus 4B has a bamboo-blind-like structure where a plurality of LEDs 42 are connected to each other using control lines 43, instead of fixedly mounting the plurality of LEDs 42 on a board 41. In the bamboo-blind-like structure, in the plurality of LEDs 42 which are linked together, the individual LEDs 42 can be allowed to emit light by an LED driver 44.

In addition, since each portion where the plurality of LEDs 42 are linked together has a high flexibility of movement, the structure can be disposed at an elastic part of a vehicle interior structural member. For example, as shown in FIG. 13, the bamboo-blind-like structure can be disposed at a backrest portion of a back seat 13.

Figure 13:
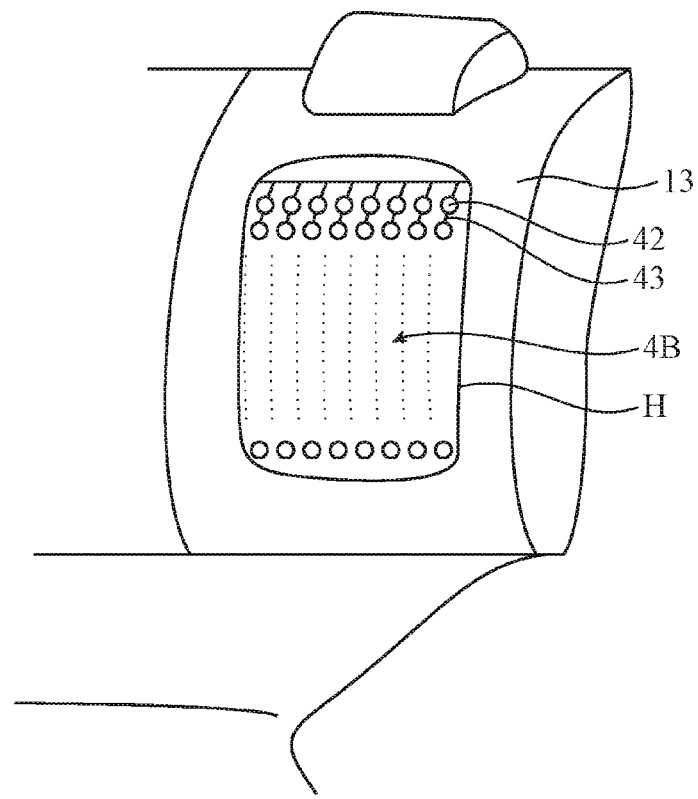
FIG. 13 is a diagram showing an example of disposition of the transmissive display apparatus of the third embodiment.

Note that in FIG. 13, in order to show a disposition mode of the transmissive display apparatus 4B, an area of the backrest portion denoted by a reference sign H is depicted in a transparent manner.

Figure 14:
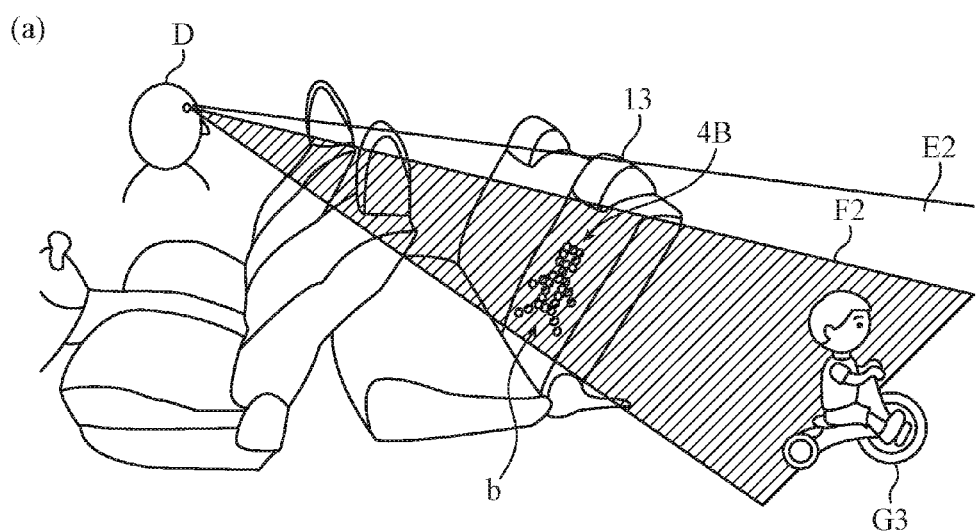
FIGS. 14(a) and 14(b) are diagrams showing an example of display of outside-of-vehicle information performed by the information display apparatus according to the third embodiment.
Figure 14:
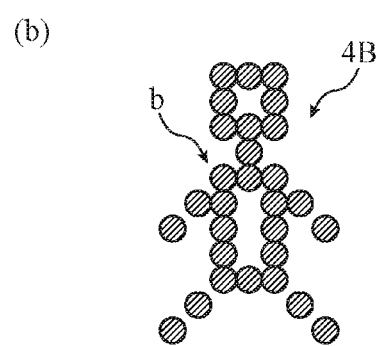

FIGS. 14(a) and 14(b) are diagrams showing an example of display of outside-of-vehicle information performed by the information display apparatus according to the third embodiment.

When, as shown in FIG. 14(a), a display controller 22 determines that a vehicle is moving backward based on vehicle information about a driving operation, the display controller identifies the structural members located rearward inside the vehicle, such as the back seat 13, as the vehicle interior structural members that form a blind spot area F2 by obstructing a visual field E2 of a driver D looking outside the vehicle.

Here, when an obstacle (child) G3 is detected behind the vehicle by an around-the-vehicle sensor 3, the display controller 22 determines the back seat 13 among the identified structural members, as the structural member present in a direction in which the obstacle G3 is detected by the around-the-vehicle sensor 3.

Thereafter, as shown in FIG. 14(b), the display controller 22 allows a transmissive display apparatus 4B at the back seat 13 to display a human-shaped mark "b" indicating the presence of the obstacle G3.

Note that the display controller 22 may change the display mode of the human-shaped mark "b" indicating the presence of the obstacle G3, according to the distance of the obstacle G3 to the vehicle which is determined by a distance determiner 20 and the type of the obstacle G3 (child) which is determined by an object determiner 21. For example, it is considered to change the color of the human-shaped mark "b" or to make the human-shaped mark "b" blink.

As described above, according to the third embodiment, the transmissive display apparatus 4B has the bamboo-blind-like structure where the plurality of LEDs 42 are connected to each other by the control lines 43. In particular, the transmissive display apparatus 4B is provided at the back seat 13 inside the vehicle, and the bamboo-blind-like structure of the plurality of LEDs 42 is disposed inside the backrest portion of the back seat 13. By such a configuration, the transmissive display apparatus 4B can also be disposed at an elastic part of a vehicle interior structural member, enabling to display the information on the obstacle at the various vehicle interior structural members.

Note that, in the present invention, free combinations of the embodiments or modifications of any component in the embodiments or omission of any component in the embodiments may be performed within the scope of the present invention.

INDUSTRIAL APPLICABILITY

Since an information display apparatus according to the present invention can display outside-of-vehicle information by a simple configuration and in a mode in which an occupant can easily visually check the information, without impairing vehicle interior design, it is suitable for, for example, a display apparatus of a driving support apparatus.

DESCRIPTION OF REFERENCE NUMERALS AND SIGNS 1 and 1A: INFORMATION DISPLAY APPARATUS, 2 and 2A: CONTROLLER, 3, 3-1, 3-2, and 3-3: AROUND-THE-VEHICLE SENSOR, 4, 4A, 4B, 4-1, 4-2, 4-3, 4-4, 4-5, . . . , 4-n, 4A-1, 4A-2, . . . , 4A-n: TRANSMISSIVE DISPLAY APPARATUS, 5: DASHBOARD, 5a: DESIGN SURFACE, 6: WINDSHIELD: 7: STEERING WHEEL, 8a and 8b: A-PILLAR, 9: VEHICLE, 9a: REAR HATCH, 9b and 13: BACK SEAT, 10: ELECTROSTATIC SENSOR, 11: BEHAVIOR DETECTION SENSOR, 12: EXTERNAL DEVICE, 12a: AUDIO DEVICE, 12b: NAVIGATION APPARATUS, 20: DISTANCE DETERMINER, 21: OBJECT DETERMINER, 22: DISPLAY CONTROLLER, 23: WARNING CONTROLLER, 23a: SPEAKER, 24: BRAKING CONTROLLER, 25: INPUT DETERMINER, 40: SURFACE PORTION, 41: BOARD, 42: LED, 43: CONTROL LINE, and 44: LED DRIVER.

The invention claimed is:

1. An information display apparatus comprising:
an outside-of-vehicle detector that detects an obstacle around a vehicle;
a transmissive display which has a plurality of light-emitting elements disposed inside a vehicle interior structural member, and performs a display by lights of the light-emitting elements transmitted through a surface of the structural member and irradiated outside; and
a controller that determines a driver's driving operation based on vehicle information about a driving operation, and allows the transmissive display with two or more light-emitting elements, which are positioned in such a manner as to obstruct the obstacle, out of the plurality of light-emitting elements disposed in an interior of the structural member present in a direction in which the obstacle is detected by the outside-of-vehicle detector, among the vehicle interior structural members that form blind spot areas by obstructing a visual field of a driver looking outside the vehicle in the driving operation, to display information on the obstacle.

2. The information display apparatus according to claim 1, wherein the controller allows the transmissive display to perform a simple display representing presence of the obstacle detected by the outside-of-vehicle detector.

3. The information display apparatus according to claim 2, wherein the simple display is any one of a symbol, a simple image, and letters indicating the presence of the obstacle.

4. The information display apparatus according to claim 2, wherein the controller changes a display mode of the simple display, according to a type of the obstacle and a distance thereof to the vehicle determined based on the information on the obstacle detected by the outside-of-vehicle detector.

5. The information display apparatus according to claim 1, wherein the transmissive display is provided at at least one of a pillar, a door, and a seat of the vehicle.

6. The information display apparatus according to claim 1, wherein the controller further allows the transmissive display at the structural member present around a driver's seat, to display the information on the obstacle detected by the outside-of-vehicle detector.

7. The information display apparatus according to claim 1, wherein the controller allows the transmissive display provided at a steering wheel to display a direction of rotation of the steering wheel determined based on the vehicle information.

8. The information display apparatus according to claim 1, comprising an external input detector that accepts an external input, wherein the controller performs a simple display for an operation and/or setting of an external device on the transmissive display; and
determines a content of the external input accepted by the external input detector, based on the simple display for the operation and/or setting of the external device on the transmissive display, and allows the external device to perform a process according to the content.

9. The information display apparatus according to claim 1, comprising an external input detector that accepts an external input, wherein the controller determines a content of the external input accepted by the external input detector, based on a display of the obstacle on the transmissive display, and when a content of the external input is a check for the obstacle, the controller makes the display of the obstacle on the transmissive display disappear.

10. The information display apparatus according to claim 1, comprising a behavior detector that detects driver's behavior, wherein the controller determines the driver's behavior accepted by the behavior detector, based on a display of the obstacle on the transmissive display, and when the behavior is behavior of checking for the obstacle, the controller makes the display of the obstacle on the transmissive display disappear.

11. The information display apparatus according to claim 1, wherein the transmissive display has a bamboo-blind-like structure where the plurality of light-emitting elements are connected via a control line.

12. The information display apparatus according to claim 11, wherein the transmissive display is provided at a seat inside the vehicle, and the bamboo-blind-like structure is disposed inside a backrest portion of the seat.

13. An information display apparatus comprising:
an outside-of-vehicle detector that detects an obstacle around a vehicle;
a transmissive display which has a plurality of light-emitting elements disposed inside a vehicle interior structural member, and performs a display by lights of the light-emitting elements transmitted through a surface of the structural member and irradiated outside;
a processor to execute a program; and
a memory to store the program which, when executed by the processor, result in performance of steps comprising,
determining a driver's driving operation based on vehicle information about a driving operation,
allowing the transmissive display with two or more light-emitting elements, which are positioned in such a manner as to obstruct the obstacle, out of the plurality of light-emitting elements disposed in an interior of the structural member present in a direction in which the obstacle is detected by the outside-of-vehicle detector, among the vehicle interior structural members that form blind spot areas by obstructing a visual field of a driver looking outside the vehicle in the driving operation, to display information on the obstacle.

* * * * *